United States Patent
Ho et al.

(10) Patent No.: US 10,019,437 B2
(45) Date of Patent: Jul. 10, 2018

(54) FACILITATING INFORMATION EXTRACTION VIA SEMANTIC ABSTRACTION

(71) Applicant: International Business Machines Corporation, Armonk, NY (US)

(72) Inventors: Ching-Tien Ho, San Jose, CA (US); Benny Kimelfeld, Santa Clara, CA (US); Yunyao Li, San Jose, CA (US); Shivakumar Vaithyanathan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 14/629,318

(22) Filed: Feb. 23, 2015

(65) Prior Publication Data

US 2016/0246779 A1    Aug. 25, 2016

(51) Int. Cl.
*G06F 17/27* (2006.01)

(52) U.S. Cl.
CPC .............................. *G06F 17/2785* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC .................................................. 704/1, 9, 10
See application file for complete search history.

(56) References Cited

U.S. PATENT DOCUMENTS

| | | | | | |
|---|---|---|---|---|---|
| 5,146,406 A | * | 9/1992 | Jensen | ................... | G06F 17/271 704/9 |
| 5,715,468 A | * | 2/1998 | Budzinski | ............... | G06F 17/27 704/9 |
| 5,799,268 A | * | 8/1998 | Boguraev | ........... | G06F 17/2775 704/10 |
| 5,836,771 A | * | 11/1998 | Ho | ........................... | G09B 5/00 434/118 |
| 5,930,746 A | * | 7/1999 | Ting | ...................... | G06F 17/271 704/2 |
| 5,943,643 A | * | 8/1999 | Van De Veen | ........ | G06F 17/271 704/2 |

(Continued)

OTHER PUBLICATIONS

Chen et al., Use of deep linguistic features for the recognition and labeling of semantic arguments, 2003, ACL, Proceedings of the 2003 conference on Empirical methods in natural language processing, pp. 41-48.*

(Continued)

*Primary Examiner* — Lamont Spooner
(74) *Attorney, Agent, or Firm* — Sherman IP LLP; Kenneth L. Sherman; Steven Laut

(57) ABSTRACT

A method includes receiving one or more natural language dependency parse trees as input. A hardware processor is used for processing the dependency parse trees by creating a mapping from nodes of the one or more dependency parse trees into actions, roles and contextual predicates. The mapping is used for information extraction. The actions include the verbs along with attributes of the verbs. The roles include arguments for the verbs. The contextual predicates include modifiers for the verbs.

20 Claims, 13 Drawing Sheets

(56) References Cited

U.S. PATENT DOCUMENTS

| | | | | |
|---|---|---|---|---|
| 5,966,686 | A * | 10/1999 | Heidorn | G06F 17/271 |
| | | | | 704/9 |
| 6,965,857 | B1 * | 11/2005 | Decary | G06F 17/2705 |
| | | | | 704/1 |
| 7,027,974 | B1 * | 4/2006 | Busch | G06F 17/271 |
| | | | | 704/4 |
| 7,664,313 | B1 * | 2/2010 | Sproat | G06F 17/212 |
| | | | | 382/154 |
| 8,594,996 | B2 * | 11/2013 | Liang | G06F 17/21 |
| | | | | 704/10 |
| 8,719,291 | B2 | 5/2014 | Gatterbauer et al. | |
| 9,262,406 | B1 * | 2/2016 | Das | G06F 17/2785 |
| 2002/0107851 | A1 * | 8/2002 | Beauchamp | G06F 17/3064 |
| 2005/0108630 | A1 * | 5/2005 | Wasson | G06F 17/241 |
| | | | | 715/230 |
| 2007/0282814 | A1 * | 12/2007 | Gupta | G06F 17/27 |
| 2008/0097951 | A1 * | 4/2008 | Gupta | G06N 5/025 |
| | | | | 706/59 |
| 2009/0100053 | A1 * | 4/2009 | Boschee | G06F 17/30705 |
| 2009/0326925 | A1 * | 12/2009 | Crider | G06F 8/30 |
| | | | | 704/9 |
| 2011/0099052 | A1 * | 4/2011 | Brun | G06F 17/2211 |
| | | | | 705/7.38 |
| 2011/0295903 | A1 | 12/2011 | Chen | |
| 2012/0096028 | A1 * | 4/2012 | Hirano | G06F 17/30722 |
| | | | | 707/771 |
| 2012/0131073 | A1 * | 5/2012 | Olney | G06F 17/2785 |
| | | | | 707/822 |
| 2013/0035931 | A1 * | 2/2013 | Ferrucci | G06F 17/30976 |
| | | | | 704/9 |
| 2014/0032209 | A1 * | 1/2014 | Etzioni | G06F 17/277 |
| | | | | 704/9 |
| 2014/0032574 | A1 | 1/2014 | Khan | |
| 2014/0108006 | A1 * | 4/2014 | Vogel | G06F 17/28 |
| | | | | 704/9 |
| 2014/0129213 | A1 * | 5/2014 | Kimelfeld | G06F 17/271 |
| | | | | 704/9 |
| 2014/0136188 | A1 * | 5/2014 | Wroczynski | G06F 17/2872 |
| | | | | 704/9 |
| 2014/0156264 | A1 * | 6/2014 | Etzioni | G06F 17/2705 |
| | | | | 704/9 |
| 2014/0297264 | A1 * | 10/2014 | Etzioni | G06F 17/2705 |
| | | | | 704/9 |
| 2015/0066483 | A1 * | 3/2015 | Zhang | G06F 19/28 |
| | | | | 704/9 |
| 2015/0278195 | A1 * | 10/2015 | Yang | G06F 17/2785 |
| | | | | 704/9 |
| 2015/0331850 | A1 * | 11/2015 | Ramish | G06F 17/28 |
| | | | | 704/9 |
| 2015/0379090 | A1 * | 12/2015 | Gou | G06F 17/30719 |
| | | | | 707/754 |
| 2016/0042058 | A1 * | 2/2016 | Nguyen | G06F 17/30684 |
| | | | | 707/771 |
| 2016/0062967 | A1 * | 3/2016 | Cantarero | G06F 17/241 |
| | | | | 715/230 |
| 2016/0078349 | A1 * | 3/2016 | Byron | G06N 5/04 |
| | | | | 706/12 |

OTHER PUBLICATIONS

Dragounova, Expressing Lexical Negation in English, 2010, Olomouc, pp. 1-57.*

Wikipedia, https://en.wikipedia.org/wiki/Verb, 2014, pp. 1-8.*

Hofford, G., "Structure Logic: A New Method that Enables Richer Meaning Representations", IP.com Journal, Mar. 21, 2014, pp. 1-447, IP.com, United States.

Whitney, R., "Semantic Transformations for Natural Language Production", IP.com Journal, Mar. 31, 1988, pp. 1-91. IP.com, United States.

Bohnet, B., et al., "Broad Coverage Multilingual Deep Sentence Generation with a Stochastic Multi-Level Realizer", Proceedings of the 23rd International Conference on Computational Linguistics (Coling 2010), Aug. 23, 2010, pp. 98-106, ACM, United States.

Culotta, A. et al., "Dependency Tree Kernels for Relation Extraction", Proceedings of the 42nd Annual Meeting in Association for Computational Linguistics (ACL '04), Jul. 21, 2004, pp. 1-8, ACM, United States.

Del Corro, L. et al., "ClausIE: Clause-Based Open Information Extraction", Proceedings of the 22nd International World Wide Web Conference Committee (WWW '13), May 13, 2013, pp. 355-366, ACM, United States.

Popescu, A-M. et al., "Extracting Product Features and Opinions from Reviews", Proceedings of the Conference on Human Language Technology and Empirical Methods in Natural Language Processing (HLT '05), Oct. 6, 2005, pp. 339-346, ACM, United States.

Banko, M. et al., "Open Information Extraction from the Web", Proceedings of the 20th International Joint Conference on Artifical Intelligence (IJCAI '07), Jan. 6, 2007, pp. 2670-2676, ACM, United States.

Li, Y. et al., "SystemT: A Declarative Information Extraction System", Proceedings of the 49th Annual Meeting of the Association for Computational Linguistics: Human Language Technologies: Systems Demonstrations (HLT '11), Jun. 21, 2011, pp. 109-114, ACM, United States.

Stevenson, M. et al., "Dependency Pattern Models for Information Extraction", Research on Language and Computation, 2009, pp. 1-36, University of Sheffield, England.

Matsumoto, S. et al., "Sentiment Classification Using Word Subsequences and Dependency Sub-trees", Proceedings of the 9th Pacific-Asia Conference on Advances in Knowledge Discovery and Data Mining (PAKDD '05), May 8, 2005, pp. 301-311, Springer-Verlag, Berlin Heidelberg.

Akbik, A. et al., "KRAKEN: N-ary Facts in Open Information Extraction", Proceedings of the Joint Workshop on Automatic Knowledge Base Construction and Web-scale Knowledge Extraction (AKBC-WEKEX '12), Jun. 7, 2012, pp. 52-56, ACM, United States.

Fundel, K. et al., "RelEx-Relation extraction using dependency parse trees", Bioinformatics, Dec. 1, 2006, pp. 365-371, Vo. 23, No. 3, Oxford University Press, England.

Akbik, A. et al., "Propminer: A Workflow for Interactive Information Extraction and Exploration using Dependency Trees", ACL System Demonstrations, 2013, pp. 1-6, Association for Computational Linguistics, United States.

* cited by examiner

600

610 —
module FeedbackExamples;

620 —
import view Actions from module ActionAPI as Actions;
import view Roles from module ActionAPI as Roles;

630 —
create dictionary NeedVerbs with case insensitive as ('want','like','wish','need');
create dictionary CustomerTerm with case insensitive as ('I','we');
create dictionary NeedSubject with case insensitive as ('agent');
create dictionary NeedObject with case insensitive as ('theme','action_theme');

640 — create view ClientNeeds as
650 — select A. sentence, O. value from Actions A, Roles S, Roles O
where Equals(GetText(A.aid),GetText(S.aid)) and
Equals(GetText(A.aid),GetText(O.aid)) and     — 660

MatchesDict('NeedVerbs',A.verbBase) and
MatchesDict('NeedSubject',S.name) and
MatchesDict('CustomerTerm',S.value) and      — 670
MatchesDict('NeedObject',O.name);

680 — output view ClientNeeds;

| Sentence (710) | Value (720) |
|---|---|
| I need to buy a second machine soon and seriously are considering something else as this has cost me time and money. | buy a second machine soon |
| What he told us was that we would need to pay an extra 17% on top of the already high purchase price of the product to get a decent warrantee. | pay an extra 17% on top of the already high purchase price of the product |
| More time was spent trying to make it clear that (I did not need) a hardware support option. | a hardware support option |
| I need my original password for bill_blackmon so that I can send/receive through your mail system which I have not needed until now. | my original password for bill_blackmon |
| this is unacceptable and I would like to seek a refund if this is not remedied asap. | to seek refund |
| My question was that I wanted to upgrade from an ZPod touch to an ZPod phone. | to upgrade from an zPod touch to an zPod phone |
| I just wish every customer support department was even half as helpful and effective as XYZ's support staff. | every customer support department was even ... |
| It seems to me that the agent should have known that and told that sometimes maybe it can be recovered but that I need to work with a data recovery specialists. | work with a data recovery specialsits. |
| I still need the installer disk for Animal 10.4.1 or given a link to download it. | the installer disk |

1105
*Go* to your room please.  ⎱
Don't *buy* that phone.  ⎰ Imperative — 1110
1106

1120          Subjunctive — 1126
I will take it if it is free.
Subjunctive
1125

1130          Infinitive — 1135
She told me to pay in advance.

1210 ─╲   ╱─1211      ╱─1212
{"esgsense":"think3",   "class":"wish",
   "roles":{"subj":"agent",   "comp:pp!about1.objprep":"theme"}},
                                              ╲─1213

1220 ─╲
   {"esgsense":"pray1",   "class":"wish",
      "roles":{"subj":"agent",   "obj":"theme"}}, 1230 ─╲
   {"esgsense":"hope1",   "class":"wish",
      "roles":{"subj":"agent",   "obj":"theme"}},

FIG. 12

FACILITATING INFORMATION EXTRACTION VIA SEMANTIC ABSTRACTION

BACKGROUND

Embodiments of the invention relate to information extraction from natural-language text, in particular, for using semantic abstraction based on translating natural-language parses into a collection of actions, roles and complimentary concepts using dependency parse trees.

With the rapid growth of textual content, information extraction is becoming increasing important as it is crucial for obtaining useful information from text. One major challenge for information extraction is that the same semantics can be expressed in many different ways. In order to develop information extraction programs, all the linguistic variants must be taken into account. Expressive information extraction systems permit the building of complex information extraction programs to handle the linguistic variants. However, the development of such programs over the raw text can be extremely time consuming and tedious.

BRIEF SUMMARY

Embodiments of the invention relate to using semantic abstraction based on translating natural-language parses into a collection of actions, roles and complimentary concepts using dependency parse trees. One embodiment includes a method that includes receiving one or more natural language dependency parse trees as input. A hardware processor is used for processing the dependency parse trees by creating a mapping from nodes of the one or more dependency parse trees into actions, roles and contextual predicates. The mapping is used for information extraction. The actions include the verbs along with attributes of the verbs. The roles include arguments for the verbs. The contextual predicates include modifiers for the verbs.

These and other features, aspects and advantages of the present invention will become understood with reference to the following description, appended claims and accompanying figures.

BRIEF DESCRIPTION OF THE SEVERAL VIEWS OF THE DRAWINGS

FIG. 6 illustrates an example system rules over the action API, according to an embodiment;

FIG. 7 illustrates output examples, according to an embodiment;

FIG. 11 illustrates examples of mood used for parsing, according to an embodiment;

FIG. 12 illustrates examples for customizing role mapping, according to an embodiment.

DETAILED DESCRIPTION

Figure 1:
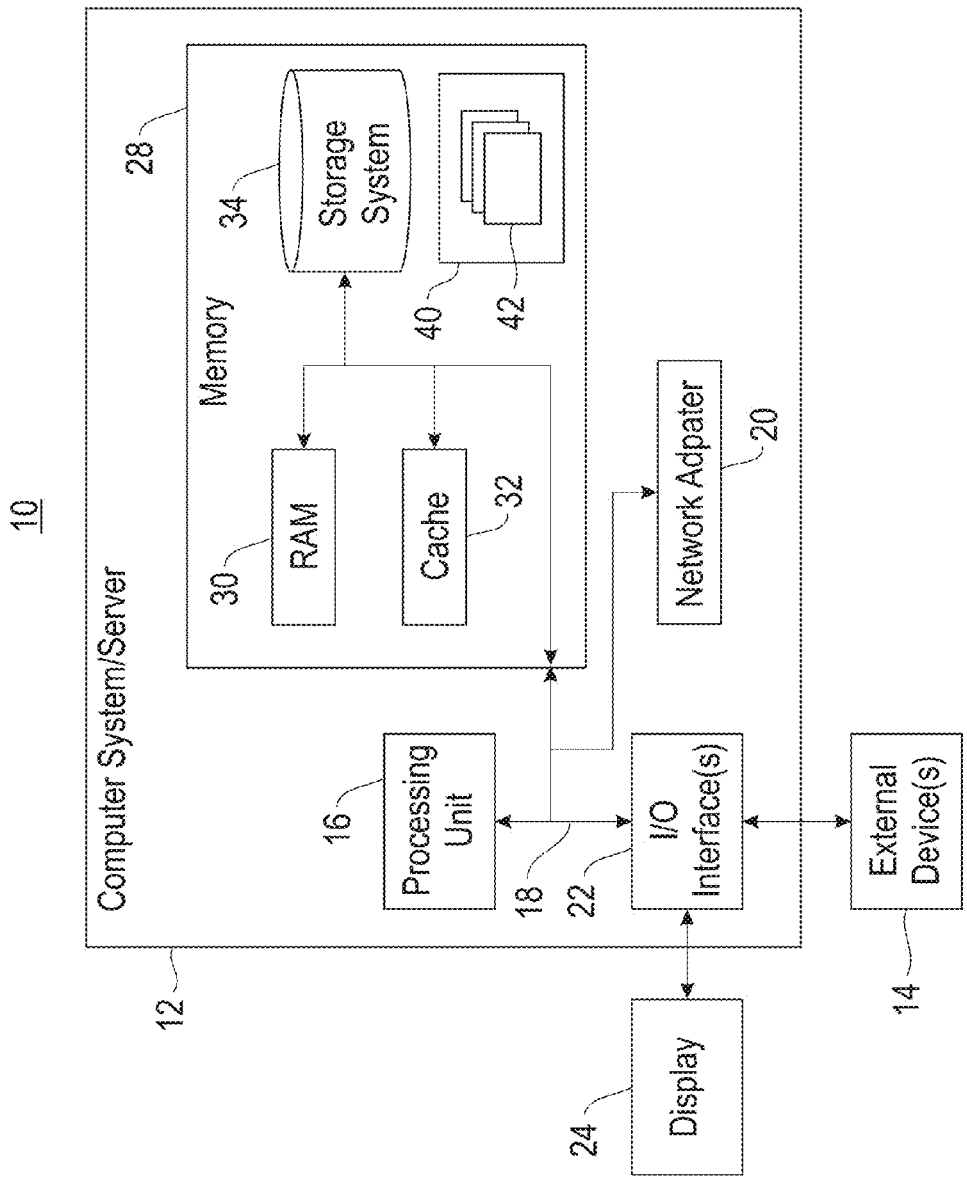
FIG. 1 depicts a cloud computing node, according to an embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example and not limitation, such architectures include a(n) Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile/non-volatile media, and removable/non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in a memory 28 by way of example and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, etc.; a display 24; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via a network adapter 20. As depicted, the network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, etc.

Figure 2:
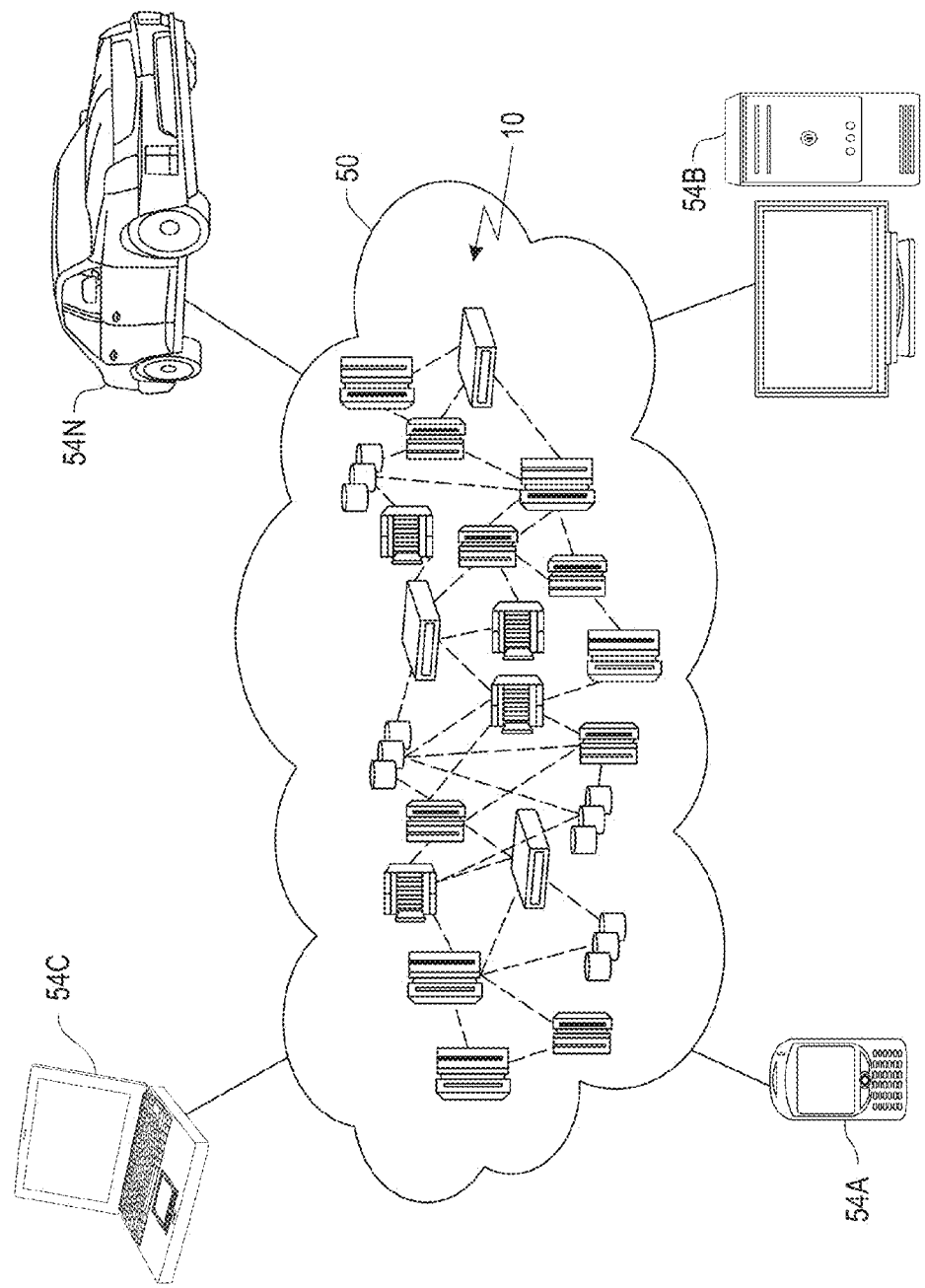
FIG. 2 depicts a cloud computing environment, according to an embodiment.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
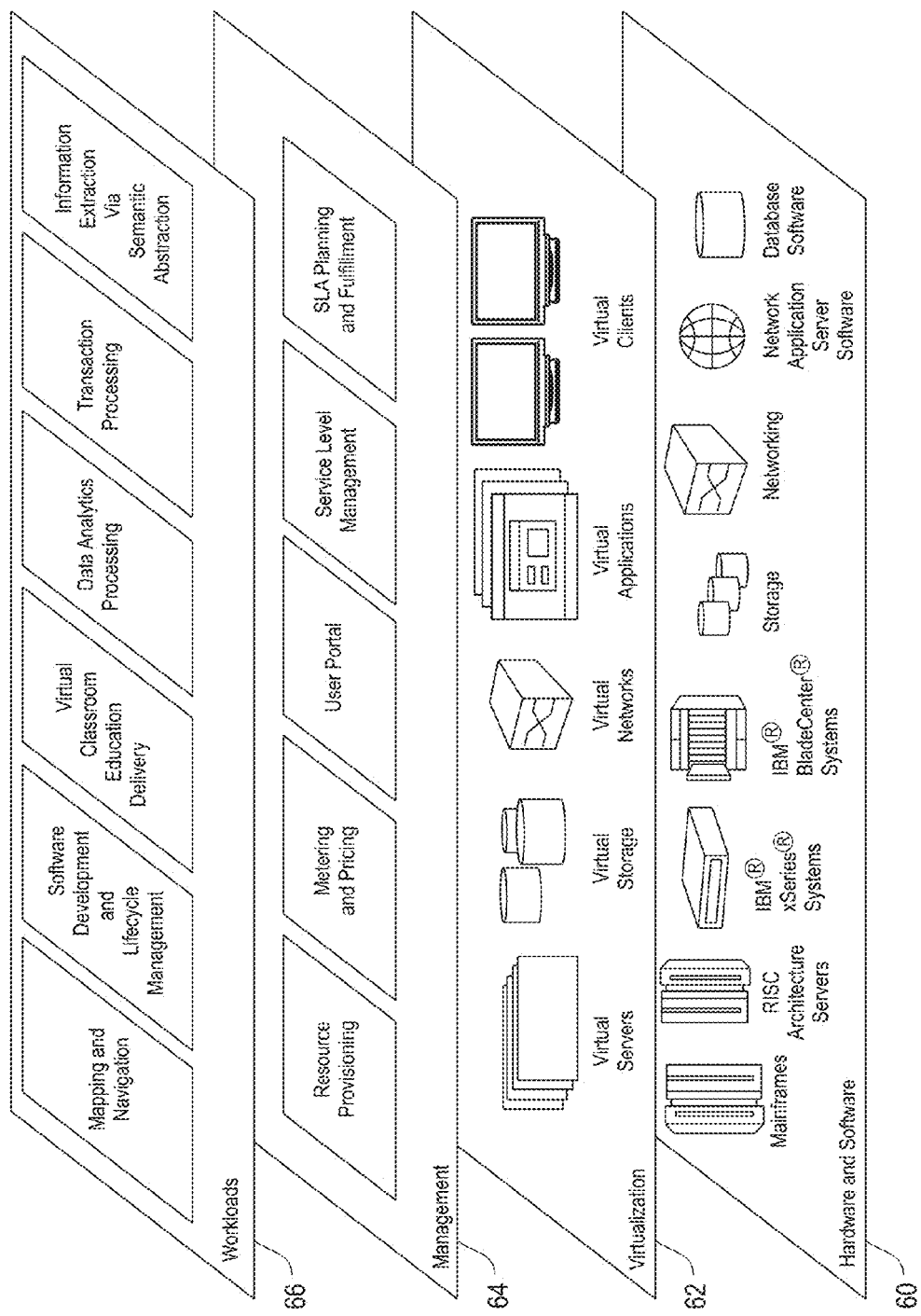
FIG. 3 depicts a set of abstraction model layers, according to an embodiment.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment and provide billing or invoicing for consumption of these resources. In one example, these resources may comprise application software licenses. Security provides identity verification for cloud consumers and tasks as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and virtual network and domain movement operations. As mentioned above, all of the foregoing examples described with respect to FIG. 3 are illustrative only, and the invention is not limited to these examples.

It is understood all functions of one or more embodiments as described herein are typically performed by the system 400 (FIG. 4), which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Embodiments of the invention relate to using semantic abstraction based on translating natural-language parses into a collection of actions, roles and complimentary concepts using dependency parse trees. One embodiment includes a method that includes receiving one or more natural language dependency parse trees as input. A hardware processor is used for processing the dependency parse trees by creating a mapping from nodes of the one or more dependency parse trees into actions, roles and contextual predicates. The mapping is used for extracting information. The actions include the verbs along with attributes of the verbs. The roles include arguments for the verbs. The contextual predicates include modifiers (e.g., a word or phrase that modifies or adds information to other parts of a sentence) for the verbs.

Figure 4:
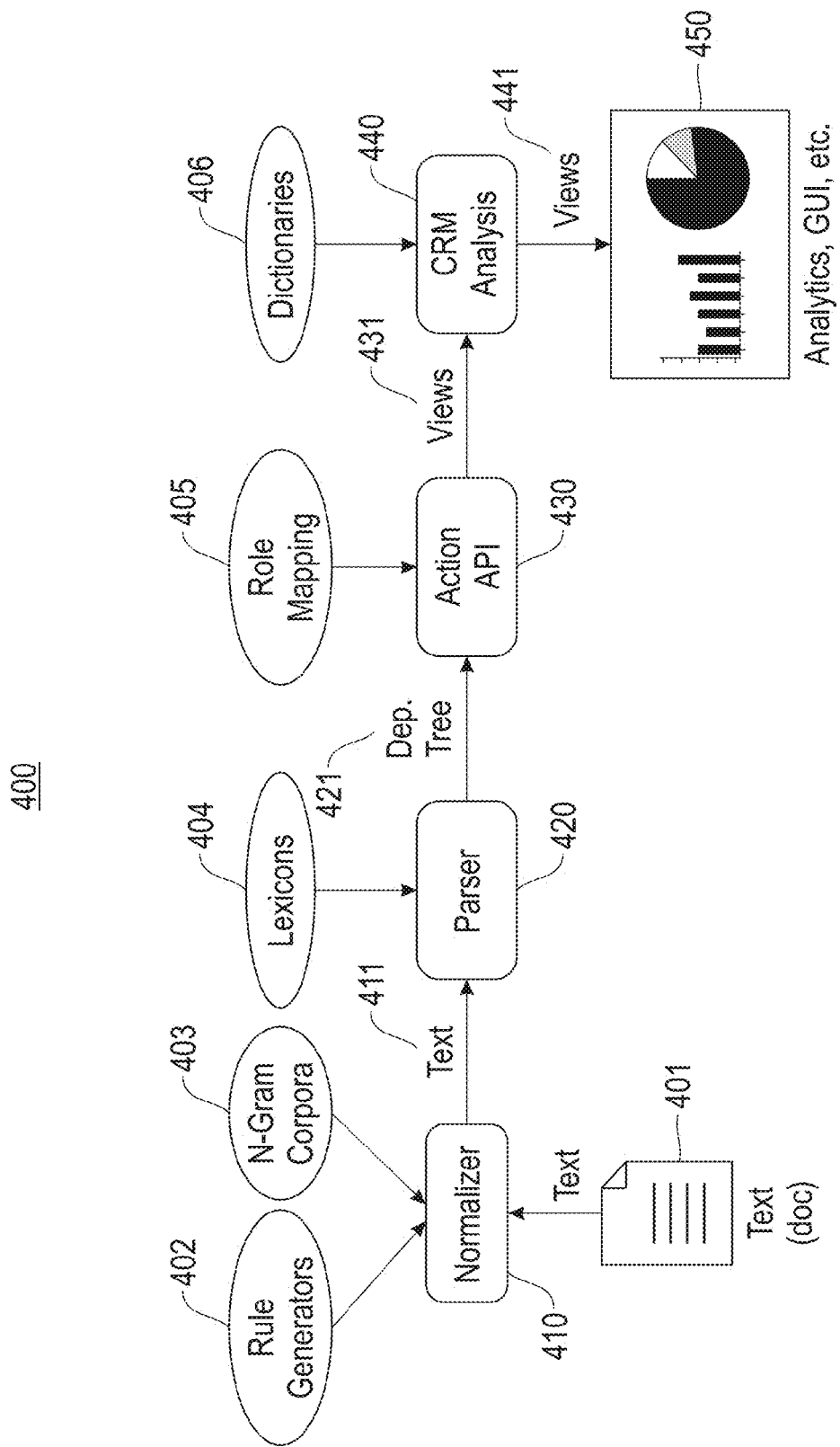
FIG. 4 is a block diagram illustrating a system flow including an action application program interface (API), according to an embodiment.

FIG. 4 is a block diagram illustrating a system 400 flow including an action application program interface (API) 430, according to an embodiment. In one embodiment, the system 400 includes an optional normalizer 410, a parser 420, and action API 430, a customer relationship management analytics (CRM) analysis process 440 and an output process 450 for analytics, a graphical user interface (GUI), etc. In one embodiment, the system 400 obtains a text item 401 as input, where text item 401 may be provided in a text file, a text document, etc. In one embodiment, the text item 401 is optionally input to the normalizer 410 that uses rule generators 402 and N-gram corpora 403 (e.g., a particular number of most frequent N-grams from the corpus of contemporary language (e.g., corpus of contemporary American English (COCA)), where N is a positive integer. In one embodiment, the normalizer 410 may optionally be used to transform text (e.g., unicode text) into an equivalent composed or decomposed form, allowing for easier sorting and searching of text.

In one embodiment, if using the optional normalizer 410, the normalized text 411 is sent to the parser 420 that uses lexicons (e.g., a language inventory) 404 for parsing the normalized text 411 into one or more natural language dependency parse trees 421. It should be noted that without parsing, the rules from the rule generators 402 have to capture all variations, for example: I like to by a car; I would have bought the car if not for my lousy test drive; I'd love to purchase a sedan; I don't need a car here at NYC; Actually, buying a new car isn't a bad idea; I just bought a new car; All I need now is a nice house and a minivan; I like to buy a car key, etc. In one embodiment, with parsing and mapping to semantic actions and arguments, rule writing is significantly easier. The dependency parse trees 421 are valuable for information extraction, however, they are difficult to digest and use by developers (and data scientists) that are not natural language processing (NLP) experts.

In one embodiment, the action API 430 includes a collection of relational language views that translate natural-language parses (from the dependency parse trees 421) into a collection of actions, roles, and additional complementary concepts. In one embodiment, the actions include verbs along with attributes of the verbs. In one embodiment, the attributes include mood, voice, tense, and verb basis. In one embodiment, the roles include arguments for the verbs, lemmata and determiners for the verbs. The contextual predicates include modifiers for a particular verb that is not a role. In one embodiment, the modifiers include adverbs, temporal modifiers, and location modifiers. In one embodiment, role mapping 405 is used by the action API 430 for using path language for defining the mappings from the dependency parse trees 421 into roles.

In a natural language utterance, every verb is exposed as an "action" (with attributes like voice, mood, and so on), and the arguments of the verb (subject, object, indirect objects, etc.) are exposed as "roles" that share a joining key with their associated action. In one embodiment, there is a default mapping from a dependency tree into actions and roles. However, some mappings are not covered by the default mapping (e.g., they require using some prepositions). In that case, a configuration file (supporting a configuration language of one embodiment) allows defining new roles through navigation in the dependency tree. In one embodiment, by using linguistic resources (e.g., VerbNet) the configuration file may be automatically enhanced by existing naming conventions for roles. VerbNet is currently the largest on-line verb lexicon available for the English language. VerbNet is a hierarchical domain-independent, broad-coverage verb lexicon with mappings to other lexical resources such as WordNet, Xtag, and FrameNet. VerbNet is organized into verb classes using refinement and addition of subclasses to achieve syntactic and semantic coherence among members of a class. Each verb class in VerbNet is completely described by thematic roles, selectional restrictions on the arguments, and frames consisting of a syntactic description and semantic predicates with a temporal function, in a manner similar to the event decomposition.

In one embodiment, the action API 430 provides additional functionalities besides the association of roles and attributes to actions. In one embodiment, the additional functionalities include the elimination of auxiliary verbs (potentially with the needed effect on voice or mood), detecting negation (and "semi-negation") from adverbs (e.g., "I rarely ate apples" vs. "I did not eat apples"), and high-level classification of verbs (e.g., "buy," "purchase" and "acquire" are in class "buy"). In addition to the actions and roles, the action API 430 contains contextual predicates, which include additional (e.g., adverbial, temporal and location) information associated with the verb of the action.

In one embodiment, the views 431 output from the action API 430 includes a collection of relational language views (e.g., annotation query language (AQL) views). It should be noted that AQL is a declarative language, with a syntax that is similar to that of the structured query language (SQL). A view is a logical statement that defines a set of tuples. Views define the tuples, but do not compute them. All of the tuples in a view have the same schema.

In one embodiment, the views 431 may be used by CRM analysis 440 along with the use of one or more dictionaries 406. In one embodiment, the views 441 from the CRM analysis 440 may be used by the output process 450 for analytics, GUI, etc. In one embodiment, the output process 450 may be further used for marketing, customer service, research, etc., where the input may be obtained from blogs, customer service dialogs, chats, emails, etc.

Figure 5:
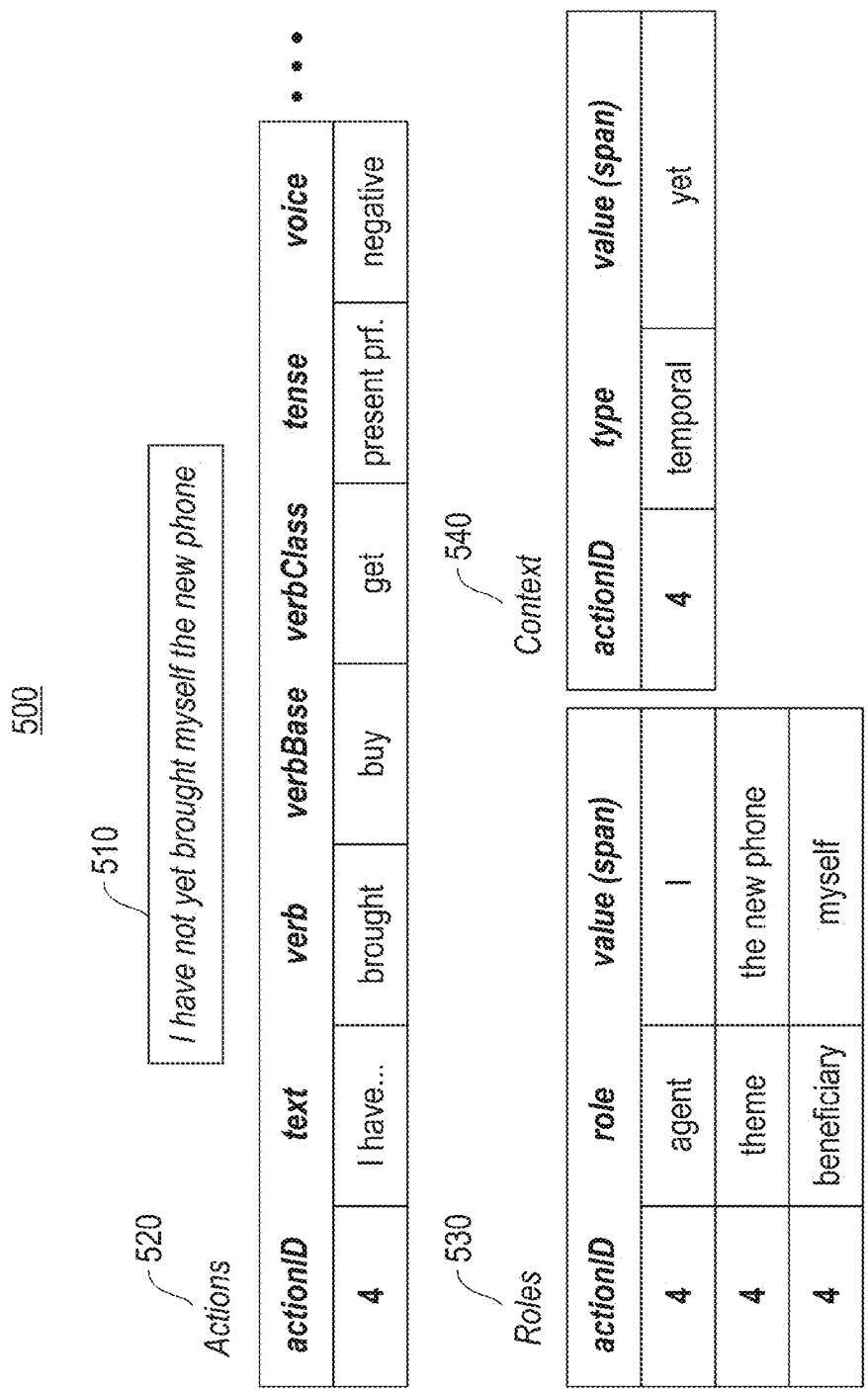
FIG. 5 illustrates an example of action API views, according to an embodiment.

FIG. 5 illustrates an example 500 of action API 430 views 431 formats, according to an embodiment. In one embodiment, an example text 510 includes the words "I have not yet bought myself the new phone." In one embodiment, the actions 520 have a format including an action ID, text, verb, verbBase, verbClass, tense, voice, etc. In one embodiment, the roles 530 have a format including an action ID, role, and value (span). In one embodiment, the context 540 has a format including an action ID, type, and value (span). In the example text 510, the text includes present perfect tense: "have bought," negative action ("have not yet bought") that is captured in voice, verb classification: "buy" is in the "get" verb class, where the "get" verb class has a "theme" and a "beneficiary" attribute names (expressed in role column).

FIG. 6 illustrates an example 600 of system rules (e.g., System T rules) over the action API 430, according to an embodiment. In one example, the example 600 includes feedback examples 610, API imports 620 (e.g., importing of actions and rules), creating dictionaries 630, create view 640, sentence selection 650, join actions plus roles 660, dictionary based selection 670 and the output view 680. In one embodiment, the rules are selected may be based on user/client needs, topic specific, location specific, demographics specific, etc. In one embodiment, the rules may change over time.

FIG. 7 illustrates output examples 700, according to an embodiment. In one embodiment, the output examples include sentences 710 and associated values 720. In one embodiment, for the sentence "[m]ore time was spent trying to make it clear that I did not need a hardware support option" a rule could have been provided for voice does not equal "negative" as the value is "a hardware support option."

Figure 8:
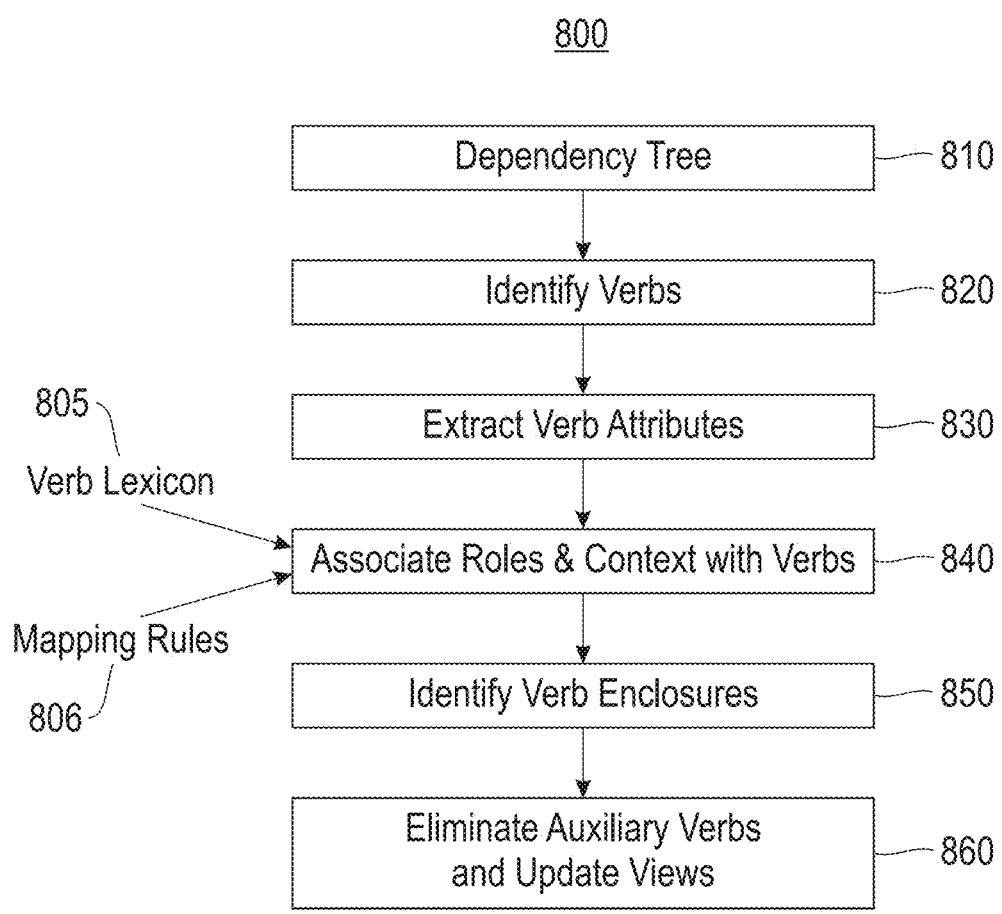
FIG. 8 illustrates a process using semantic abstraction, according to an embodiment.

FIG. 8 illustrates a process flow diagram 800 using semantic abstraction, according to an embodiment. In one embodiment, the process 800 begins using a natural language dependency parse tree 810 as input. In block 820, verbs in the dependency tree are identified. In block 830, verb attributes are extracted. In block 840, roles and context are associated with the verbs using verb lexicon 805 (e.g., VerbNet) and mapping rules 806. In block 850 verb enclosures are identified. In block 860, auxiliary verbs are eliminated and views are updated. The process blocks for process 800 are described in further details below.

Figure 9:
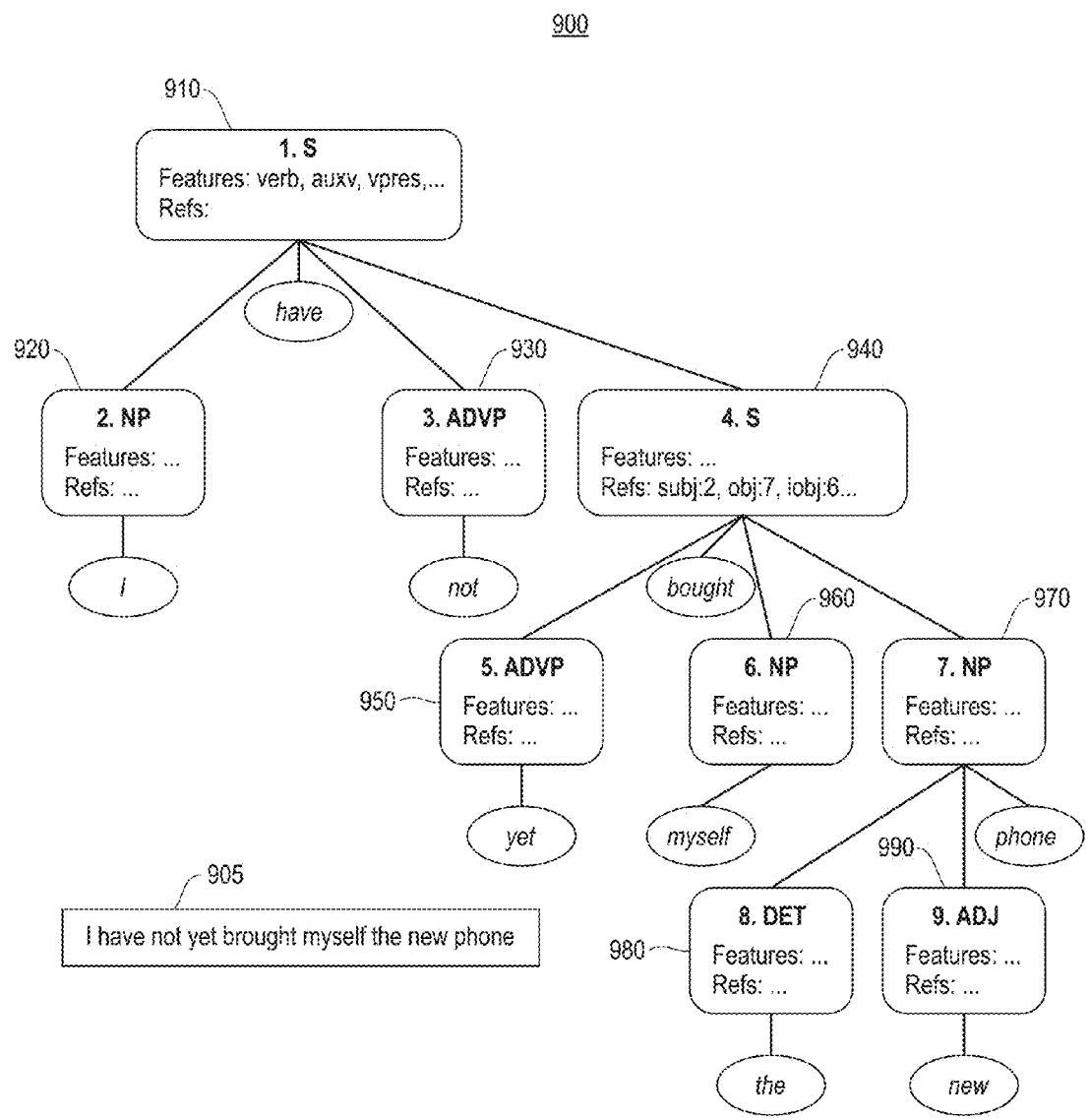
FIG. 9 is diagram showing an example use over a dependency tree, according to an embodiment.

FIG. 9 is diagram showing an example dependency parse tree 900, according to an embodiment. In process block 810, the dependency parse tree is used as input to the process 800 (FIG. 8). In the example dependency parse tree 900, the example sentence 905 of "I have not yet bought myself the new phone" is parsed. In the node 910 includes the parse result is the verb "have" of sentence 905 that has an ID of 1. For the node 920 (the left modifier of 1), the parse result is the noun phrase (NP) "I" that has the ID of 2. For the node 930 (the right modifier of 1), the parse result is the adverb phrase (ADVP) "not" that has the ID of 3. For the node 940, the parse result is the verb "bought" that has the ID of 4. For the node 950, the parse result is the ADVP "yet" that has the ID of 5. For the node 960, the parse result is the NP "myself" that has the ID of 6. For the node 970, the parse result is the NP "phone" that has the ID of 7. For the node 980, the parse result is the determiner (DET) "the" that has the ID of 8. For the node 990, the parse result is the adjective (ADJ) "new" that has the ID of 9. Each of the nodes includes the ID, features of the word and references. In one example, the features of node 910 may include type, mood, tense, voice, auxiliary, transitive, intransitive, regular, irregular, etc. In another example, the references of node 940 may include a reference to subjective mood for ID 2, to objective or indicative mood for ID 7, etc.

In one embodiment, the example dependency parse tree 900 is used to identify the verbs in process block 820 (FIG. 8). Table 1 (below) shows an example of the verbs identified as ID 1 ("have") and ID 4 ("bought").

TABLE 1

| Verbs |
| --- |
| 1 |
| 4 |

In one embodiment, in process block 830 (FIG. 8) the verb attributes are identified and extracted. Table 2 (below) shows an example of the extracted verb attributes (e.g., base word, tense, mood, etc.).

TABLE 2

| Verbs | base | tense | mood | . . . |
| --- | --- | --- | --- | --- |
| 1 | have | present | normal | . . . |
| 4 | buy | past | negative | . . . |

In one embodiment, in process block 840 (FIG. 8) roles and context are associated with the verbs. Table 3 (below) shows an example of actionID, associated role and value (span) and table 4 (below) shows an example of actionID, associated context type and value (span).

TABLE 3

| Roles | | |
| --- | --- | --- |
| actionID | role | value (span) |
| 1 | agent | I |
| 4 | agent | I |
| 4 | theme | the new phone |
| 4 | beneficiary | myself |

TABLE 4

| Context | | |
| --- | --- | --- |
| actionID | type | value (span) |
| 4 | temporal | yet |

In one embodiment, in process block 850 (FIG. 8) verb enclosures are identified. Table 5 (below) shows an example of an identified enclosure table and includes verbs, base, tense, mood, and identified enclosures.

TABLE 5

| Verbs | base | tense | mood | enc |
| --- | --- | --- | --- | --- |
| 1 | have | present | normal | |
| 4 | buy | past | negative | 1 |

In one embodiment, in process block 860 (FIG. 8) auxiliary verbs are eliminated and the view(s) is updated. Table 6 (below) shows an example of the elimination of verb "have" with ID of 1. In this example, the verb with ID 1 is eliminated (shown with strikethrough). In this example, the updated view includes an update for tense from past to present perfect.

TABLE 6

| Verbs | Base | tense | mood | enc |
| --- | --- | --- | --- | --- |
| ~~1~~ | ~~have~~ | ~~present~~ | ~~normal~~ | |
| 4 | buy | Present perfect | negative | |

In one embodiment, table 7 (below) shows actions for the Action API 430 (FIG. 4). In one embodiment, table 7 includes attributes, type and semantics.

TABLE 7

| Attribute | Type | Semantics |
| --- | --- | --- |
| aid | TEXT | A unique identifier for the action |
| rootNodeID | TEXT | An identifier of the root node of the action in the dependency tree |
| sentence | SPAN | The original sentence from which the action is drawn |
| text | SPAN | The sub-span constituting the action itself |
| verb | SPAN | The span constituting the action verb |
| verbBase | TEXT | The base of the verb |
| verbClass | TEXT | Internal classification verbs. Customizable through roles.json. (Default: verbClass = verbBase). |

TABLE 7-continued

| Attribute | Type | Semantics |
|---|---|---|
| tense | TEXT | presents/past/future/unset |
| tenseSpec | TEXT | simple/progressive/perfect |
| voice | TEXT | interrogative/negative/normal |
| verbSentiment | TEXT | Sentiment associated with the verb (independent of the action itself). Customizable through roles.json. |
| mood | TEXT | imperative/infinitive/subjunctive/unset |
| enclosing | TEXT | Identifier (aid) of an enclosing action |

In one embodiment, table 8 (below) shows an example of actions for the Action API 430 (FIG. 4) for an example input sentence. In this example, the sentence used is "It didn't upset me last year that they charged me so much money for the service."

TABLE 8

| Attribute | Action 1 | Action 2 |
|---|---|---|
| aid | 12 | 14 |
| rootNodeID | 4 | 8 |
| sentence | It didn't upset me last year that . . . | It didn't upset me last year that . . . |
| text | It didn't upset me last year that . . . | they charged me so much money for the service |
| verb | upset | charged |
| verbBase | upset | charge |
| verbClass | annoy | bill |
| tense | past | past |
| tenseSpec | simple | simple |
| Voice | negative | normal |
| verbSentiment | negative | normal |
| Mood | normal | normal |
| enclosing | NA | 12 |

Figure 10:
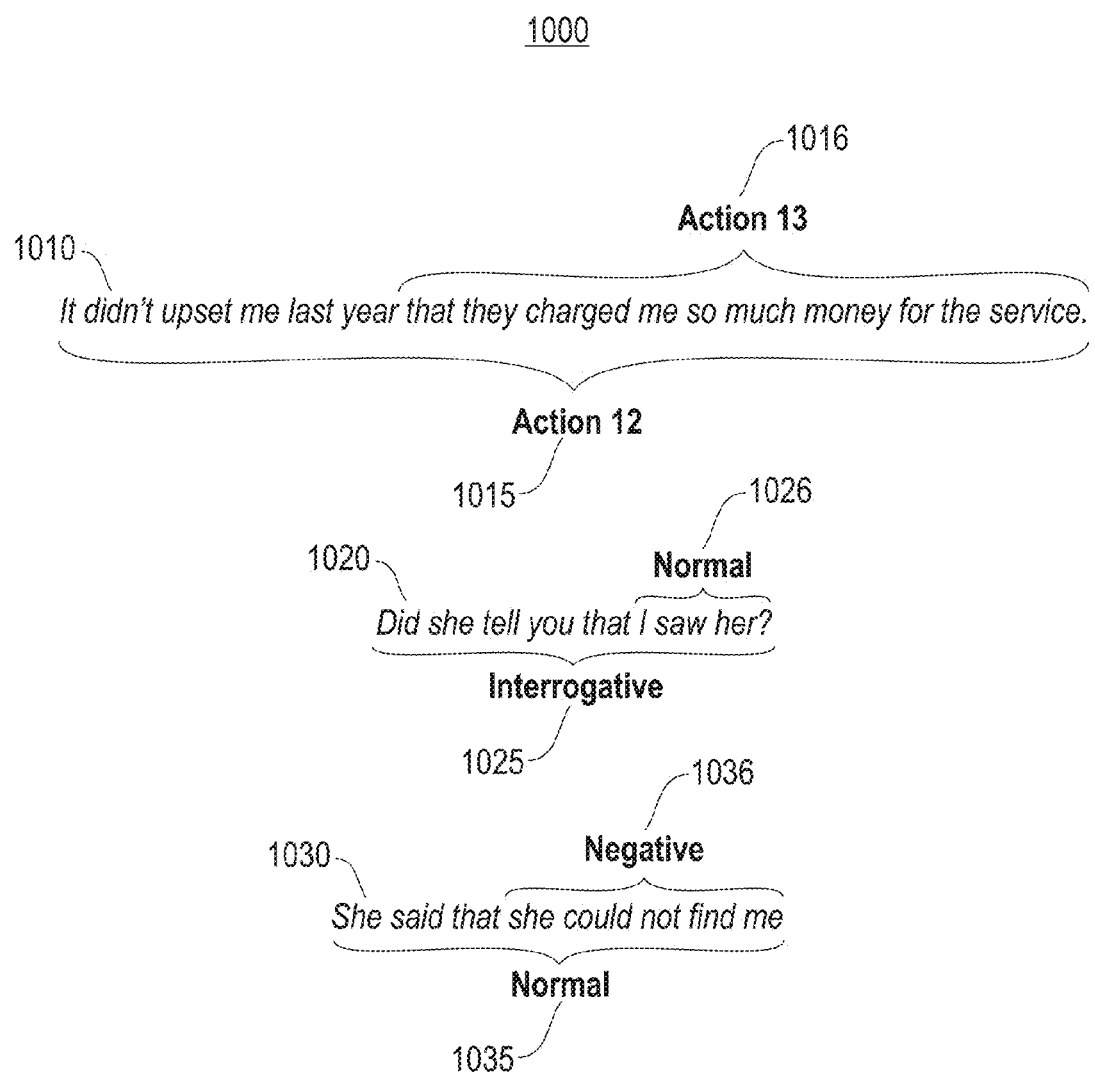
FIG. 10 illustrates examples of identifiers and enclosures, and voices in nested sentences used for parsing, according to an embodiment.

FIG. 10 illustrates examples 1000 of identifiers and enclosures for example sentence 1010, and voices in nested sentences used for parsing for example sentences 1020 and 1030, according to an embodiment. In one embodiment, an action's "aid" is a unique identifier that is used for joining with the roles and context views. An action's rootNodeID is an identifier of the node that corresponds to the action's verb in the dependency parse tree (e.g., dependency parse tree 900, FIG. 9). In one embodiment, the rootNodeID is used for joining with an English Slot Grammar (ESG) core parser views (e.g., ESG.Nodes). It should be noted that the ESG parser analyzes the syntactic structure of an input sentence and produces a sentence parse tree. The ESG parser not only annotates the syntactic category of a phrase (e.g., NP or VP), it also annotates the thematic role of a phrase (e.g., "subject" or "object"). In one embodiment, an action's enclosing is the action's enclosing action, in case of nested verbs. For the example sentence 1010, there are two actions. The first action 1015 has an aid of 12 and the second action 1016 has an aid of 13.

In one embodiment, the verb class associates the verb with a generalized category. In one example, the classes may be taken from VerbNet unified verb index. In one example, the class association is performed in roles.json (JavaScript Object Notation). In one embodiment, a verb not mentioned in roles.json is assigned the verb base as the verb class.

In one embodiment, the example sentences 1020 and 1030 are provided to show voices in nested sentences. For the example sentence 1020, the voice 1025 is interrogative and the voice 1026 is normal. For the example sentence 1030, the voice 1035 is normal and the voice 1036 is negative.

FIG. 11 illustrates examples 1100 of the mood used for parsing, according to an embodiment. Example sentences 1105 and 1106 show the mood 1110 of imperative. In one example embodiment, in the case of an "if" condition, both premise and conclusion are declared subjective. Example sentence 1120 shows the mood 1125 and 1126 as subjunctive. Example sentence 1130 shows a mood 1135 as infinitive (i.e., usually a "to verb . . . ").

In one embodiment, table 9 (below) shows ActionAPI.Roles and ActionApi.Context. The table columns include attribute, type and semantics, and the rows are for aid, name, determiner, value, head and headNorm.

TABLE 9

| Attribute | Type | Semantics |
|---|---|---|
| Aid | TEXT | The identifier of the action (join with Actions.aid) |
| Name | TEXT | The name of the action argument. |
| Determiner | SPAN | The determiner of the argument. |
| value | SPAN | The value of the argument. |
| head | SPAN | The head word of the value |
| headNorm | TEXT | A normal form (base) of the head |

In one embodiment, tables 10, 11 and 12 (below) show examples of roles. In one example, the roles for the verb "upset" in the sentence "It didn't upset me last year that they charged me so much money for the services" are shown in table 10. In another example, the roles for the verb "charged" in the sentence "It didn't upset me last year that they charged me so much money for the services" are shown in table 11. In yet another example, the roles for the verb "like" in the sentence "I really don't like her name and phone numbers" are shown in table 12. In one embodiment, the role names depend on the verb (e.g., "recipient" is relevant to just some of the verbs). In one embodiment, the verb-to-roles mappings are configured in roles.json. By default (i.e., for out-of-roles.json) verbs there are agent (subject) and theme (object). In one embodiment, all roles are optional. That is, a verb may occur with any subset of its assigned roles.

TABLE 10

| Attribute | Role 1 | Role 2 |
|---|---|---|
| Aid | 12 | 12 |
| Name | agent | theme |
| determiner | | |
| Value | It | me |
| Head | It | me |
| headNorm | it | me |

TABLE 11

| Attribute | Role 3 | Role 4 | Role 5 | Role 6 |
|---|---|---|---|---|
| Aid | 13 | 13 | 13 | 13 |
| Name | agent | recipient | asset | reason |
| determiner | | | so much | the |
| Value | they | me | so much money | the services |
| Head | they | me | money | services |
| headNorm | they | me | money | service |

TABLE 12

| Attribute | Role 1 | Role 2 | Role 3 | Role 4 |
|---|---|---|---|---|
| Aid | 13 | 13 | 14 | 14 |
| Name | agent | theme | agent | theme |
| determiner |  | her |  | her |
| Value | I | name | I | phone numbers |
| Head | I | name | I | numbers |
| headNorm | I | name | I | number |

Context contains information from the sentence that is not captured by the actions and roles, but may still be important for analyzing the action. In one example embodiment, context names include: temporal, location, comparable ("She is tall like a tower"), manner (adverb), in, on, over, . . . (prepositions). Table 13 (below) shows the attributes and context for the verb "upset" in the example sentence "It didn't upset me last year that they charged me so much money for the services." Table 14 (below) shows the attributes and context for the verb "behaved" in the example sentence "He well behaved the other day in Sacramento." Table 15 (below) shows the attributes and context for the verb "cooked" in the example sentence "Fortunately, he happily cooked all day in the kitchen."

TABLE 13

| Attribute | Context 1 |
|---|---|
| Aid | 12 |
| Name | temporal |
| determiner |  |
| Value | last year that . . . |
| Head | last year |
| headNorm | last year |

TABLE 14

| Attribute | Context 1 | Context 2 | Context 3 |
|---|---|---|---|
| Aid | 15 | 15 | 15 |
| Name | manner | temporal | location |
| determiner |  | the |  |
| Value | well | the other day | in Sacramento |
| Head | well | day | Sacramento |
| headNorm | well | day | Sacramento |

TABLE 15

| Attribute | Context 1 | Context 2 | Context 3 | Context 4 |
|---|---|---|---|---|
| aid | 15 | 15 | 15 | 15 |
| name | manner | manner | temporal | in |
| determiner |  |  | all | the |
| value | Fortunately | happily | all day | the kitchen |
| head | Fortunately | happily | day | kitchen |
| headNorm | fortunately | happily | day | kitchen |

FIG. 12 illustrates examples 1200 for customizing role mapping, according to an embodiment. In one example role mapping 1210, sense by ESG 1211, internal classification 1212 and mapping into VerbNet arguments 1213 are shown. The role mapping 1210 shows mapping for "think3" in class wish and roles for {"subj":"agent", "comp:pp!about1.objprep":"theme"}. Additional example role mappings 1220 and 1230 are shown in FIG. 12.

Figure 13:
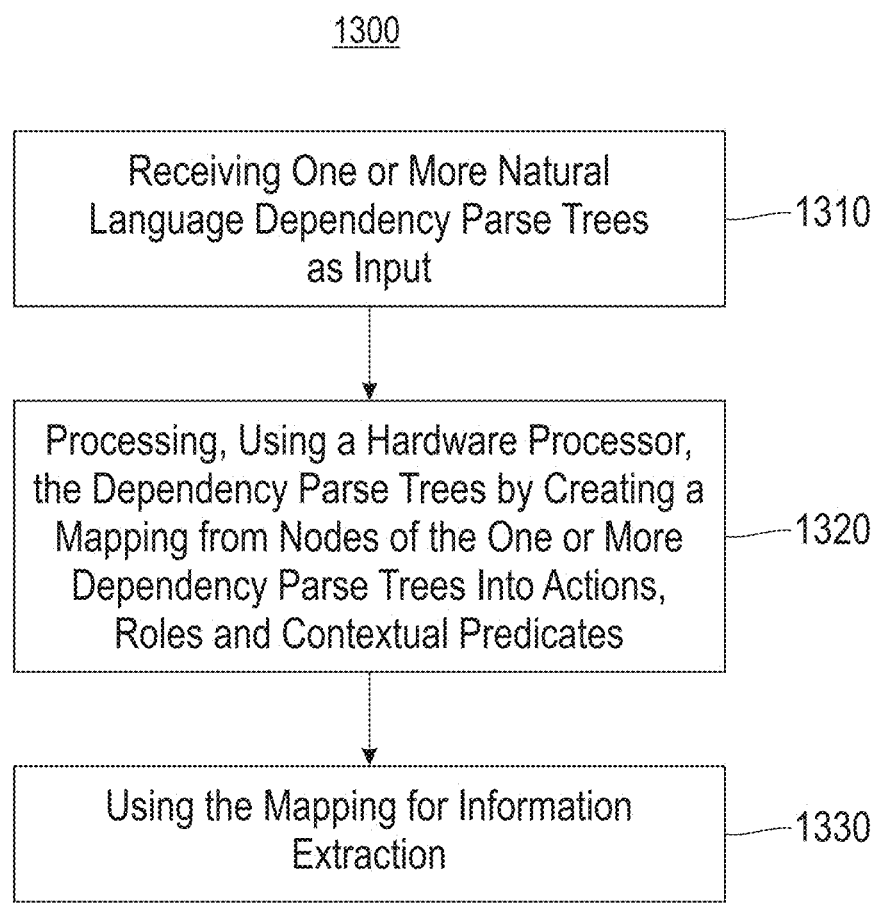
FIG. 13 is a block diagram of a process for processing dependency parse trees using semantic abstraction, according to an embodiment.

FIG. 13 is a block diagram of a process 1300 for processing dependency parse trees using semantic abstraction, according to an embodiment. In one embodiment, in block 1310 one or more natural language dependency parse trees are received as input. In one embodiment, in block 1320, a hardware processor is used for processing the dependency parse trees by creating a mapping from nodes of the one or more dependency parse trees into actions, roles and contextual predicates. In one embodiment, in block 1330 the mapping is used for extracting information. In one embodiment, the actions include the verbs along with attributes of the verbs. In one embodiment, the roles include arguments for the verbs. In one embodiment, the contextual predicates include modifiers for the verbs.

In one embodiment, process 1300 may include further processing by identifying verbs and extracting verb attributes, and associating the roles and context with the verbs. In one embodiment, process 1300 may include further processing by identifying verb enclosures, eliminating auxiliary verbs, updating one or more relational language views for the input, and outputting a collection of relational language views.

In one embodiment, for process 1300 the roles further include lemmata and determiners for the verbs. In one embodiment, the attributes include any of: mood, voice, tense, and verb basis. In one embodiment, the modifiers include adverbs, temporal modifiers, and location modifiers. In one embodiment, for process 1300, processing indices for verb categorization is used to determine the role names. In one embodiment, process 1300 may include a declarative path language that is used for defining the mapping of the dependency parse trees into the roles.

In one embodiment, block 1320 may further include eliminating auxiliary verbs, eliminating optional information from auxiliary verbs that is propagated into the action, and exposing enclosure relationships among the actions. In one embodiment, for process 1300 adverbs and explicit negation language are uniformly exposed as negative and semi-negative voice, and the contextual predicates are classified into types.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving natural language dependency parse trees as input;
   processing, using a hardware processor, the dependency parse trees using an action application program interface (API) that creates a mapping from nodes of the dependency parse trees into actions, roles and contextual predicates, eliminates auxiliary verbs, detects negation from adverbs, classifies verbs, and outputs a collection of annotation query language (AQL) views, wherein mappings other than a default mapping use a configuration file that provides for defining new roles through navigation in the dependency parse trees; and
using the mapping for information extraction,
wherein:
the actions are placed in a data format that comprises columns including said verbs along with columns for said verb attributes that comprise action identification, verb base, verb classification, verb tense, verb voice and verb sentiment, wherein verb sentiment is independent of an action;
the roles comprise arguments for said verbs; and
the contextual predicates include modifiers for said verbs.

2. The method of claim 1, wherein said processing further comprises:
identifying verbs and extracting verb attributes; and
associating the roles and context with said verbs.

3. The method of claim 2, wherein said processing further comprises:
identifying verb enclosures;
eliminating auxiliary verbs;
updating one or more AQL views for the input; and
outputting a collection of AQL views,
wherein an AQL view is a logical statement that defines a set of tuples, and all tuples in a view have a same schema.

4. The method of claim 1, wherein the roles further comprise lemmata and determiners for said verbs, and the modifiers comprise one or more of adverbs, temporal modifiers, and location modifiers.

5. The method of claim 4, wherein the AQL is used for defining the mapping of the dependency parse trees into the roles.

6. The method of claim 1, wherein for said processing, indices for verb categorization is used to determine the role names.

7. The method of claim 1, wherein said processing further comprises:
eliminating optional information from auxiliary verbs that is propagated into the action; and
exposing enclosure relationships among the actions.

8. The method of claim 1, wherein adverbs and explicit negation language are uniformly exposed as negative and semi-negative voice, and the contextual predicates are classified into types.

9. A computer program product for information extraction via semantic abstraction, the computer program product comprising a non-transitory computer readable storage medium having program code embodied therewith, the program code executable by a processor to:
receive natural language dependency parse trees as input;
process, using the processor, the dependency parse trees by using an action application program interface (API) that creates a mapping from nodes of the dependency parse trees into actions, roles and contextual predicates, eliminates auxiliary verbs, detects negation from adverbs, classifies verbs, and outputs a collection of annotation query language (AQL) views, wherein mappings other than a default mapping use a configuration file that provides for defining new roles through navigation in the dependency parse trees; and
using the mapping for extracting information,
wherein:
the actions are placed in a data format that comprises columns including said verbs along with columns for said verb attributes that comprise action identification, verb base, verb classification, verb tense, verb voice and verb sentiment, wherein verb sentiment is independent of an action;
the roles comprise arguments for said verbs; and
the contextual predicates include modifiers for said verbs.

10. The computer program product of claim 9, wherein said process further comprises:
identifying verbs and extracting verb attributes; and
associating the roles and context with said verbs.

11. The computer program product of claim 10, wherein said process further comprises:
identifying verb enclosures;
updating one or more AQL views for the input; and
outputting a collection of AQL views,
wherein an AQL view is a logical statement that defines a set of tuples, and all tuples in a view have a same schema.

12. The computer program product of claim 9, wherein the roles further comprise lemmata and determiners for said verbs, and the modifiers comprise one or more of adverbs, temporal modifiers, and location modifiers.

13. The computer program product of claim 12, wherein the AQL is used for defining the mapping of the dependency parse trees into the roles.

14. The computer program product of claim 9, wherein for said processing, indices for verb categorization is used to determine the role names.

15. The computer program product of claim 9, wherein said process further comprises:
eliminating optional information from auxiliary verbs that is propagated into the action; and
exposing enclosure relationships among the actions.

16. The computer program product of claim 9, wherein adverbs and explicit negation language are uniformly exposed as negative and semi-negative voice, and the contextual predicates are classified into types.

17. A system comprising:
a processor;
a storage device coupled to the processor, wherein the storage device stores one or more text files;
a parser that parses text into natural language dependency parse trees;
an action process that uses the processor for processing the dependency parse trees by using an action application program interface (API) that creates a mapping from nodes of the dependency parse trees into actions, roles and contextual predicates, eliminates auxiliary verbs, detects negation from adverbs, classifies verbs, and outputs a collection of annotation query language (AQL) views, wherein:
mappings other than a default mapping use a configuration file that provides for defining new roles through navigation in the dependency parse trees;
the mapping is used for information extraction;
the actions are placed in a data format that comprises columns including said verbs along with columns for said verb attributes that comprise action identification, verb base, verb classification, verb tense, verb voice and verb sentiment, wherein verb sentiment is independent of an action;
the roles comprise arguments for said verbs; and
the contextual predicates include modifiers for said verbs.

18. The system of claim 17, wherein said action process further comprises:

identifying verbs and extracting verb attributes;
associating the roles and context with said verbs;
identifying verb enclosures;
updating one or more AQL views for the input; and
outputting a collection of AQL views,
wherein an AQL view is a logical statement that defines a set of tuples, and all tuples in a view have a same schema.

19. The system of claim 17, wherein the roles further comprise lemmata and determiners for said verbs, the modifiers comprise one or more of adverbs, temporal modifiers, and location modifiers, for said processing, indices for verb categorization is used to determine the role names, and the AQL is used for defining the mapping of the dependency parse trees into the roles.

20. The system of claim 17, wherein said action process further comprises:
eliminating optional information from auxiliary verbs that is propagated into the action; and
exposing enclosure relationships among the actions,
wherein adverbs and explicit negation language are uniformly exposed as negative and semi-negative voice, and the contextual predicates are classified into types.

* * * * *